(12) United States Patent
Bommaraju

(10) Patent No.: US 9,193,588 B2
(45) Date of Patent: *Nov. 24, 2015

(54) HYDROGEN ELIMINATION AND THERMAL ENERGY GENERATION IN WATER-ACTIVATED CHEMICAL HEATERS

(76) Inventor: Tilak Bommaraju, Grand Island, NY (US)

(*) Notice: Subject to any disclaimer, the term of this patent is extended or adjusted under 35 U.S.C. 154(b) by 1232 days.

This patent is subject to a terminal disclaimer.

(21) Appl. No.: 12/701,990

(22) Filed: Feb. 8, 2010

(65) Prior Publication Data

US 2010/0136186 A1 Jun. 3, 2010

Related U.S. Application Data

(63) Continuation-in-part of application No. 12/322,596, filed on Feb. 4, 2009, now Pat. No. 8,205,608, which is a continuation-in-part of application No. 12/069,995, filed on Feb. 14, 2008, now Pat. No. 7,971,585, which (Continued)

(51) Int. Cl.
*F24J 1/00* (2006.01)
*F24J 3/00* (2006.01)
*C01B 3/00* (2006.01)
*A47J 36/28* (2006.01)

(Continued)

(52) U.S. Cl.
CPC ............... *C01B 3/0005* (2013.01); *A47J 36/28* (2013.01); *C01B 3/508* (2013.01); *H01M 6/32* (2013.01); *H01M 6/34* (2013.01); *Y02E 60/324* (2013.01)

(58) Field of Classification Search
USPC .................. 126/204, 236.04, 236.05, 236.06, 126/236.07, 236.01, 263.04, 263.05, 126/263.06, 263.07; 44/250, 251, 252, 253
See application file for complete search history.

(56) References Cited

U.S. PATENT DOCUMENTS 1,901,313 A * 3/1933 Mann .............................. 44/253
2,805,146 A 9/1957 Henderson et al.
(Continued)

FOREIGN PATENT DOCUMENTS

JP 58065784 A 4/1983
WO WO 2007/134295 11/2007

OTHER PUBLICATIONS

Federal Register/Final Results of Expedited Sunset Reviews of the Countervailing Duty Orders: Pure Magnesium and Alloy Magnesium from Canada, by the International Trade Administration on Nov. 4, 2005, p. 3 of 4.*

(Continued)

*Primary Examiner* — Steven B McAllister
*Assistant Examiner* — Desmond C Peyton
(74) *Attorney, Agent, or Firm* — Simpson & Simpson, PLLC

(57) ABSTRACT

A hydrogen suppressing, flameless, heat generating chemical composition including magnesium or a magnesium-containing alloy, a hydrogen suppressor or eliminator, particulate carbon, a metallic salt including a cation and an anion and water. The anion is selected from the group consisting of silicate, carbonate, bicarbonate, phosphate, borate, perborate, percarbonate, perphosphate, persulfate, nitrate, nitrite, ferrate, permanganate, and stannate and combinations thereof. The magnesium or magnesium-containing alloy, hydrogen suppressor or eliminator, particulate carbon, metallic salt and water are each present in a proportional amount to generate sufficient heat to heat water, medical supplies and/or consumable rations.

18 Claims, 9 Drawing Sheets

Related U.S. Application Data is a continuation-in-part of application No. 11/657,852, filed on Jan. 25, 2007, now abandoned.

(60) Provisional application No. 60/764,213, filed on Feb. 1, 2006.

(51) Int. Cl.
  *C01B 3/50* (2006.01)
  *H01M 6/32* (2006.01)
  *H01M 6/34* (2006.01)

(56) References Cited

U.S. PATENT DOCUMENTS

| | | | |
|---|---|---|---|
| 3,867,155 A * | 2/1975 | Davis et al. | 106/38.27 |
| 3,874,504 A | 4/1975 | Verakas | |
| 3,976,049 A * | 8/1976 | Yamashita et al. | 126/263.02 |
| 4,043,314 A | 8/1977 | Trumble et al. | |
| 4,054,727 A | 10/1977 | O'Non et al. | |
| 4,080,953 A | 3/1978 | Mitchell et al. | |
| 4,093,424 A * | 6/1978 | Yoshida et al. | 44/250 |
| 4,114,591 A * | 9/1978 | Nakagawa | 126/263.02 |
| 4,199,548 A * | 4/1980 | Kaiho et al. | 422/305 |
| 4,205,957 A * | 6/1980 | Fujiwara | 44/250 |
| 4,223,661 A * | 9/1980 | Sergev et al. | 126/204 |
| 4,255,157 A * | 3/1981 | Yamaguchi et al. | 44/250 |
| 4,264,362 A | 4/1981 | Sergev et al. | |
| 4,516,564 A * | 5/1985 | Koiso et al. | 126/263.02 |
| 4,522,190 A | 6/1985 | Kuhn et al. | |
| RE32,026 E * | 11/1985 | Yamashita et al. | 126/263.02 |
| 4,756,299 A * | 7/1988 | Podella | 126/263.02 |
| 5,117,809 A | 6/1992 | Scaringe et al. | |
| 5,180,718 A | 1/1993 | Kump et al. | |
| 5,355,869 A | 10/1994 | Pickard et al. | |
| 5,454,363 A * | 10/1995 | Sata | 126/263.01 |
| 5,460,160 A | 10/1995 | Parrott | |
| 5,465,707 A * | 11/1995 | Fulcher et al. | 126/263.08 |
| 5,517,981 A * | 5/1996 | Taub et al. | 126/263.01 |
| 5,611,329 A | 3/1997 | Lamensdorf | |
| 5,904,710 A * | 5/1999 | Davis et al. | 607/108 |
| 5,906,637 A * | 5/1999 | Davis et al. | 607/108 |
| 5,935,486 A | 8/1999 | Bell et al. | |
| 5,984,995 A * | 11/1999 | White | 75/230 |
| 6,048,326 A | 4/2000 | Davis | |
| 6,063,463 A | 5/2000 | Schuleter, Jr. et al. | |
| 6,146,732 A * | 11/2000 | Davis et al. | 428/64.1 |
| 6,248,257 B1 | 6/2001 | Bell et al. | |
| 6,890,553 B1 | 5/2005 | Sun et al. | |
| 6,920,873 B2 | 7/2005 | Venkatesan et al. | |
| 6,933,333 B2 | 8/2005 | Clulow et al. | |
| 7,856,948 B2 * | 12/2010 | Wong et al. | 122/211 |
| 8,256,412 B2 * | 9/2012 | Kumamoto et al. | 126/263.02 |
| 8,261,734 B2 * | 9/2012 | Dodo | 126/204 |
| 2005/0056269 A1 | 3/2005 | Venkatesan et al. | |
| 2005/0262757 A1 * | 12/2005 | Wong et al. | 44/250 |
| 2006/0154006 A1 * | 7/2006 | Usui et al. | 428/34.1 |
| 2007/0272090 A1 | 11/2007 | Bommaraju | |
| 2008/0200971 A1 * | 8/2008 | Dodo | 607/108 |
| 2008/0202490 A1 * | 8/2008 | Dodo | 126/263.07 |
| 2008/0283036 A1 * | 11/2008 | Dodo | 126/263.02 |
| 2008/0283038 A1 * | 11/2008 | Dodo | 126/263.06 |

OTHER PUBLICATIONS

F. Witte et al./Degradable Biomaterials Based on Magnesium Corrosion, Current Opinion in Solid State and Material Science, 2008: 12:63-72.*

Vuorilehto, K., "An environmentally friendly water-activated manganese dioxide battery", Kluwer Academic Publishers, Journal of Applied Elecrochemistry, vol. 33, pp. 15-21 (2003), The Netherlands.

Spellman, P.J. et al., "magnesium and Aluminum Cells", Handbook of Betteries, Ed. D. Linden, McGraw-Hill Inc., Chapter 9 (1995), New York.

Koontz, R.F. "Magnesium Water-Activated Batteries", Handbood of Batteries, Ed. D. Linden, McGraw-Hill Inc., Chapter 17 (1995), New York.

USPTO, Office Communication, Dec. 18, 2013, pp. 1-13, Alexandria, VA.

* cited by examiner

HYDROGEN ELIMINATION AND THERMAL ENERGY GENERATION IN WATER-ACTIVATED CHEMICAL HEATERS

CROSS-REFERENCE TO RELATED APPLICATIONS

This application is a Continuation-in-Part of application Ser. No. 12/322,596, filed on Feb. 4, 2009, which is a Continuation-in-Part of application Ser. No. 12/069,995, filed on Feb. 14, 2008, which is a Continuation-in-Part of application Ser. No. 11/657,852, filed on Jan. 25, 2007, which claims the benefit of Provisional Application Ser. No. 60/764,213, filed on Feb. 1, 2006, which applications are incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract Nos. W911QY-06-C-0021, W911QY-07-P-0335 and W911QY-08-C-0096 awarded by the Department of Defense.

BACKGROUND OF THE INVENTION

Flameless Chemical Heaters (FCH), also known as Flameless Ration Heaters (FRH), are used in Meal, Ready-to-Eat (MRE) packaging to provide hot meals to soldiers in the field or for warming or heating medical supplies or food rations in confined spaces (e.g., tents, underwater shelters) or in remote locations where there is no heat source. These FCHs or FRHs are generally based on the reaction of magnesium with water to form magnesium hydroxide and hydrogen which releases about 85 kcal of energy per mole of magnesium. Equation [1] below sets forth this reaction.

$$Mg + 2H_2O \rightarrow Mg(OH)_2 + H_2 + \Delta \quad [1]$$

There are two types of MREs. The first is an individual meal for the soldier. The second one is a family-style meal for a group of 10-20 soldiers, called the Unitized Group Ration-Express (UGR-E). Both of these MREs use a Flameless Ration Heater (FRH) as the heat source for the hot meal. The temperature of a 250 gram individual MRE entrée can be raised by 100° F. in about 10 minutes using a 14 g FRH. Typically, the process of heating food consists of adding about 40 ml of water to the FRH by the military or other user, in order to activate the chemical reaction that produces the heat. Presently, the FRH consists of a magnesium, iron and salt mixture. The iron is used to activate the reaction of magnesium with water, whereas the salt prevents the formation of a magnesium oxide film on the magnesium metal surface. The reaction products are magnesium hydroxide and hydrogen. With the individual MRE, the liberation of up to 13 liters of hydrogen gas has not been a substantial safety problem.

The Unitized Group Ration-Express (UGR-E) is a complete meal in a box and can feed small groups of eighteen soldiers. Again, the food is heated by using a proportionally larger FRH that is activated by the addition or distribution of water. The problem associated with the release of hydrogen is significantly magnified with group meals. For a UGR-E weighing 28 pounds and requiring approximately 400 g of heater material, the amount of hydrogen released is typically 13.5 cubic feet or 380 liters. Thus, the concern is that generation of this large quantity of hydrogen in a confined space will exceed the Lower Explosive Limit of 4%.

Accordingly, there is a need for an improved system for the elimination, or at least minimization of hydrogen generation in magnesium/water based flameless heaters.

SUMMARY OF THE INVENTION

It is therefore a principal object of the invention to eliminate or suppress the cogeneration of hydrogen in all types of magnesium-based FCHs, to prevent the release of hydrogen into the atmosphere and preventing potentially explosive situations by means of a novel process.

Thus, one principal aspect of the invention includes useful methods for generating energy for flameless heating, such as for foodstuffs, water, medical supplies, etc., especially in the case of outdoor applications for camping, emergency, military applications all without the cogeneration of hazardous hydrogen by the steps of:

(i) forming a reaction mixture including magnesium or magnesium-containing alloy, a hydrogen eliminator or suppressor and particulate carbon; and, (ii) adding a metallic salt and water to the reaction mixture, the metallic salt includes a cation and an anion and the anion is selected from the group consisting of silicate, carbonate, bicarbonate, phosphate, borate, perborate, percarbonate, perphosphate, persulfate, nitrate, nitrite, ferrate, permanganate, and stannate and combinations thereof.

The metallic salt and water are added either sequentially or together and the reaction mixture, metallic salt and water in combination generate sufficient thermal energy for heating an article or substance while simultaneously eliminating or suppressing the generation of hydrogen. Thus, the metallic salt may be added to the reaction mixture prior to the addition of water, the water may be added to the reaction mixture prior to the addition of the metallic salt, the metallic salt and water may be added to the reaction mixture simultaneously or the metallic salt and water may form a solution which is in turn added to the reaction mixture.

This inventor discovered a new class of useful hydrogen suppressors or eliminators for flameless heaters.

Accordingly, it is still a further principal object of the invention to provide novel methods and compositions of matter for the flameless generation of thermal energy, including heater devices and meal, ready-to-eat packaged meals wherein the methods and compositions not only suppress or eliminate the cogeneration of potentially hazardous hydrogen, but surprisingly, were discovered to provide a substantially accelerated temperature rise for more prompt heating of the packaged meal compared to other state-of-the-art flameless chemical heaters.

Generally, for purposes of this invention the expression "hydrogen suppressor" as appearing in the specification and claims is intended to mean any metal-containing oxidizing agent that is suitable for at least minimizing, and more preferably, eliminating the cogeneration of hydrogen in the presence of magnesium or a magnesium-containing alloy. The metal of the metal-containing oxidizing agent, more specifically, is one having multiple valences, and includes as a preferred group, oxides of transition metals, such as manganese and/or oxides of ruthenium, and more particularly, manganese dioxide and ruthenium dioxide, to name but a few.

It should be understood, there are other representative examples of reactants in addition to oxides of manganese and ruthenium as hydrogen suppressors or eliminators, which when mixed with magnesium and reacted with water at least minimize, and more preferably totally suppress the cogeneration of hydrogen, while effectively generating the desired thermal energy. Generally, the useful hydrogen suppressors or eliminators are transition metal oxides that avoid the cogeneration of hydrogen in the reaction with magnesium or magnesium alloys. Representative examples include noble metals, such as platinum, iridium and rhodium. Other multivalent transition metal oxides include such members as iron, cobalt, nickel, silver, gold, tin, zirconium, hafnium, tantalum, lead, copper, and so on.

Useful magnesium-containing alloys for the above reaction mixture can also include at least one alloying element, such as iron, cobalt, nickel, zinc, aluminum and mixtures thereof.

The subject invention also contemplates optional additives in practicing the flameless heating methods disclosed herein comprising at least one member selected from hydrogen overvoltage suppressors, promoters, flowing agents and reaction activators.

The subject invention also contemplates the addition of a combination of metallic salts to the composition of step (i). For example, the metallic salt added to the composition of step (i) may include a plurality of unique metallic salts. Such compositions including a plurality of metallic salts are within the spirit and scope of the claimed invention.

As previously mentioned, it is still a further principal object of the invention to provide novel hydrogen suppressing or eliminating flameless, thermal energy generating chemical compositions. The compositions comprise reaction mixtures having at least: magnesium or a magnesium-containing alloy; a hydrogen suppressor or eliminator; particulate carbon; a metallic salt including a cation and an anion, wherein the anion is selected from the group consisting of silicate, carbonate, bicarbonate, phosphate, borate, perborate, percarbonate, perphosphate, persulfate, nitrate, nitrite, ferrate, permanganate, and stannate and combinations thereof; and, water. Moreover, in some embodiments, the cation is selected from the group consisting of an alkaline metal and an alkali metal, while in other embodiments, the cation is selected from the group consisting of calcium, magnesium and potassium.

Generally, the reactants are present in proportional amounts sufficient to generate heat for promptly raising the temperature of substances, products or articles, such as water, medical supplies, consumable rations, and the like, to the desired temperature within a reasonable time period. As previously pointed out, it was surprisingly and unexpectedly discovered the novel hydrogen suppressor or eliminator compositions of the present invention provide a substantially accelerated temperature rise over known flameless heat generating compositions comprising magnesium and water. Moreover, it was also surprisingly and unexpectedly discovered that the introduction of a metallic salt of the present invention provides more desirable heater performance characteristics, i.e., rate of heating and amount of hydrogen generation.

As previously mentioned, the hydrogen suppressing or eliminating flameless heat generating compositions may have other optional reactants, such as a hydrogen overvoltage suppressors, reaction promoters, flowing agents and reaction activators.

In addition to magnesium metal, the hydrogen suppressing, flameless heat generating reaction mixtures may also be prepared from alloys of magnesium, prepared from alloying metals, such as iron, cobalt, nickel, zinc, aluminum and mixtures of the same. Such alloys are known among skilled artisans, and are commercially available through ordinary channels of commerce.

Besides magnesium, the flameless heat generating reaction mixtures, like the previously described methods, also comprise at least one hydrogen eliminator/suppressor, such as oxides of manganese and/or ruthenium, and more particularly, manganese dioxide and/or ruthenium dioxide in a sufficient amount to suppress the generation of hydrogen. This includes other transition metal oxides like those previously discussed in connection with the methods of the invention.

It is yet a further principal object of the invention to provide for heater devices, such as trays and pouches comprising the hydrogen suppressing, flameless, heat generating compositions, particularly for heating water, food rations, including medical supplies especially useful for camping and military applications. This is especially intended to include Meal, Ready-to-Eat military ration packaging comprising the above flameless heater devices.

BRIEF DESCRIPTION OF THE DRAWING

For a further understanding of the invention and its characterizing features reference should now be made to the accompanying drawings wherein.

DETAILED DESCRIPTION OF THE PREFERRED EMBODIMENTS

Figure 1:
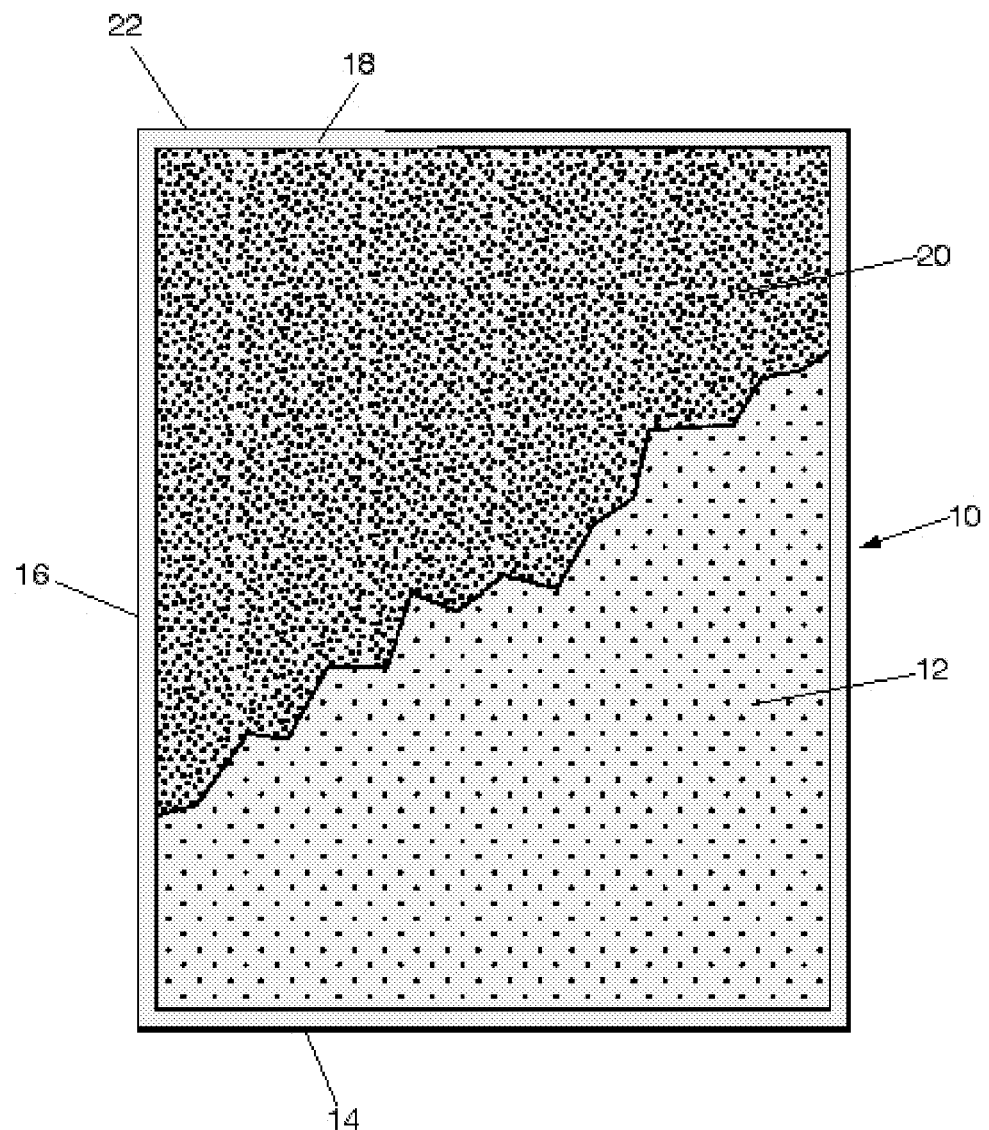
FIG. 1 is a top plan view of a porous sealed packet of flameless heat generating composition of the invention with a portion of the porous sealed cloth removed to show the milled composition.

The invention relates to novel methods and reaction mixtures/compositions for the generation of flameless heat mainly without the co-generation of potentially hazardous hydrogen previously associated with prior art methods and compositions. The methods of the invention employ at least one transition metal oxide powder, such as an oxide of manganese and/or ruthenium, for example, mixed with powdered magnesium or magnesium-containing alloy to generate flameless heat, free of, or with minimal cogeneration of hydrogen. The methods of the present invention can in part be demonstrated by the following representative reaction scheme set forth in Equation [2]:

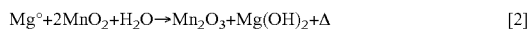
$$Mg°+2MnO_2+H_2O \rightarrow Mn_2O_3+Mg(OH)_2+\Delta \qquad [2]$$

It should be appreciated that thermodynamically, Equations [1] and [2] are sanctioned to proceed and generate the same amount of heat when the reactants are mixed in proportions dictated by the stoichiometry. Thus, the amount of heat generated by 1 gram of Mg via Equation [1] is the same as 5.37 grams of the reactants via Equation [2].

The reaction according to Equation [2] eliminates or suppresses hydrogen generation, or at least minimizes its cogeneration, while providing accelerated temperature rise over prior methods, i.e., more spontaneous heat generation than the known $Mg+H_2O$ reaction of Equation [1], as will be demonstrated by the methods below currently used in flameless chemical heaters or flameless ration heaters. It may be noted that the addition of $CuCl_2$, $NaNO_3$, and trichloroacetic acid to magnesium were believed to eliminate the hydrogen evolution reaction. However, $NaNO_3$ and trichloroacetic acid are not effective in fully suppressing hydrogen generation, and $CuCl_2$ in the MREs is not acceptable because of environmental and health considerations.

The novel chemical compositions of the present invention react and generate sufficient heat for promptly heating water, medical supplies, consumable rations, and the like, without simultaneously generating hydrogen. Methods of the invention rely on a metallic element, e.g., magnesium or alloy thereof, a hydrogen suppressor or eliminator, a metallic salt and water, the latter of which acts as a reactant and a medium for the reaction. Generally, the hydrogen suppressor or eliminator is a transition metal oxide, and include inter-alia noble and non-noble metal oxides. Other useful representative oxides include $PtO$, $IrO_2$, $RhO_2$, $Fe_2O_3$, $Co_3O_4$, $NiO$, $Ag_2O$, $Au_2O_3$, $CuO$, $TiO_2$, $ZrO_2$, $HfO_2$, $Ta_2O_5$ and $PbO_2$.

Optional additives for the hydrogen suppressing flameless heat generating chemical compositions and methods may include a hydrogen overvoltage suppressor, a promoter, flowing agent, activators, and the like.

The metallic element in the chemical composition that generates heat is magnesium or magnesium alloy containing from about 0.001% to about 10% iron, cobalt, nickel, zinc, aluminum, either singly or in combination with each other. A preferred composition is pure or substantially pure magnesium with small or trace amounts of other metals, e.g., <0.001% to about 0.1% of the alloying elements, iron, cobalt, nickel, zinc and aluminum. One preferred hydrogen suppressor in the chemical composition is $MnO_2$ and $RuO_2$. A preferred hydrogen suppressor may be either $\gamma$-$MnO_2$ or $\beta$-$MnO_2$, both known oxides, made either electrolytically or chemically by known methods, or from a naturally occurring ore that is treated. The amount of $MnO_2$ in the chemical composition is in ranges from about 1 to about 10 times the stoichiometric amount required for the $Mg+MnO_2$ reaction with water, the preferred amount being 1-10 times the stoichiometry.

The hydrogen overvoltage suppressor in the chemical composition may be a metal sulfide, the metal preferably being Fe, Co, Ni, or a highly electrically conductive carbon, present in amounts ranging from about 0.001 to about 1%. The promoter in the chemical composition is preferably a carbon in particulate or powder form, present in an amount ranging from about 0.001 to about 20 percent-by-weight. The filler or flowing agent includes such representative members as silicon dioxide and calcium carbonate, and is present in an amount ranging from about 0.001 to about 10 percent-by-weight. They are effective in also promoting the reaction rate of the flameless heater reaction mixtures. Activators for the reaction mixtures include alkali metal halides, such as NaCl, magnesium halide salts, such as $MgCl_2$, $MgBr_2$, including $Mg(ClO_4)_2$, and so on. Additionally, activators for the reaction mixtures include thermally and electrically conducting, high surface area synthetic graphite and other conducting carbon materials. An example of a suitable synthetic graphite includes Asbury 4827, produced by Asbury Graphite Mills, Inc., of Asbury, N.J., while suitable conducting carbons include Asbury TC 307, also produced by Asbury Graphite Mills, Inc., KETJEN-BLACK® (such as EC600JD), produced by Akzo Nobel Polymer Chemicals LLC, of Chicago, Ill., BLACK PEARLS® 2000 or 1300, both produced by Cabot Corporation, Alpharetta, Ga. The amount of activator can vary in the range from about 0.001 to about 50%. One preferred activator is $MgCl_2$, the other being electrically conductive carbon.

The reaction scheme set forth supra is an electrochemical corrosion reaction, the anodic reaction being the oxidation of Mg to form $Mg^{2+}$ ions, the cathodic reaction being the reduction of $MnO_2$ to $Mn_2O_3$ and the electron transfer processes proceeding on the surface of $MnO_2$. It is for this reason that there is no need for a conducting electrolyte, such as a salt solution, to activate the reaction described supra. However, Mg is prone to form MgO and therefore, the reaction described supra does not proceed to completion unless an electrically conducting material such as carbon is added to the $Mg/MnO_2$ mixture and blended thoroughly to establish/provide good electrical connectivity between $MnO_2$ and Mg sites.

$MgCl_2$ serves the same purpose but in a different way. Thermodynamic potential-pH diagrams for an Mg/water system at various temperatures show that the pH at which $Mg^{2+}$ is in equilibrium with $Mg(OH)_2$ shifts to lower pH values as the temperature increases. Thus, when $MgCl_2$ is added, the temperature rises to as high as 120-150° C., and facilitates the solubility of $Mg(OH)_2$ at pH=7, which is the pH of the water added to the reactants. Note that at pH=7 and at 25° C., the stable species is $Mg^{2-}$, whereas at pH=7 and at 90° C., there is an equilibrium between these two species. This is the reason why addition of $MgCl_2$ promotes the accessibility of the blocked MgO sites. The pH value at which $Mg^{2+}$ is in equilibrium with $Mg(OH)_2$ is strongly dependent on the activity of $Mg^{2+}$ ions in the solution. It has been found that the higher the activity, the lower the pH value. We generally added $MgCl_2$ corresponding to an activity of >>1.

It will be understood, activators, e.g., $MgCl_2$ and carbon, may be introduced into the flameless heater compositions of the invention by various methods. For example, one method provides for blending/mixing an activator, such as $MgCl_2$ and/or carbon in particulate form into the milled magnesium and hydrogen suppressor or eliminator when preparing the reaction mixture, before introducing the water reactant. Alternatively, an aqueous solution of the $MgCl_2$, e.g., 5 to 7 M solution of the activator in the water reactant (45 to 60 wt % solution), can be prepared and introduced together as a salt solution into the milled Mg and hydrogen suppressor or eliminator reaction mixture. However, the former method of blending the activator with the milled Mg and hydrogen suppressor or eliminator is generally more preferred because it is more effective in suppressing hydrogen than the latter method. Moreover, the addition of the metallic salt of the present invention may occur in the same fashion as the introduction of the activators. For example, the metallic salt may be either milled with the Mg and hydrogen suppressor, or alternatively, may be used to form an aqueous solution which is later added to the Mg and hydrogen suppressor mixture. Still further, the metallic salt may be incorporated via either means as a pure metallic salt, or alternatively, a plurality of suitable metallic salts in combination.

Example 1

In order to demonstrate the details of the invention based on a $Mg/MnO_2+H_2O$ system according to the equation [2] above, the following experiment was conducted.

A 99.98% pure Mg metal sample of 500μ particle size from Superior Metal Powders, Franklin, Pa., was used in this test, and contained trace amounts, i.e., 85 ppm Al, 4 ppm Cu, 300 ppm Fe, 250 ppm Mn, 50 ppm Na, 150 ppm Si, 100 ppm Zn and 50 ppm Ca. In addition, a 300μ size γ-$MnO_2$ powder from Tronox, LLC, Henderson, N.V., was used with a purity of 99%. The γ-$MnO_2$ contained trace amounts, i.e., 8600 ppm S, 2600 ppm Ca, <100 ppm Mg, <1000 ppm Al, <100 ppm Si, <100 ppm Cl, 700 ppm K, <1000 ppm Cr and <100 Sn ppm.

The above Mg and γ-$MnO_2$ powders were used to make a batch sample in a stoichiometric ratio according to equation [2], above. Approximately 500 g of the 300μ particle size $MnO_2$ and 69.44 g of 500 μMg were combined and placed in a mill. In this case the mill was a Vibrokinetic Energy (VKE) Mill, from Microgrinding System, Inc., Little Rock, Ark., model 624 (diameter=6" and tube length=24"). This mill was operated with 36 stainless steel rods (6 with a diameter=1", 30 with a diameter=7/16") with a length of 24". The sample mixture was introduced into the mill via a 2" diameter feed. All the screws and openings were tightened and secured prior to running the mill for 6 hours. At the end of the 6 hour milling period, the sample remained in the mill over night to cool. The sample was removed with a Nalgene scoop, transferred to a 600 ml stainless steel beaker and stored in a desiccator with calcium sulfate as the dehydrating agent.

Following FIG. 1 of the drawings, polypropylene bag 10 was fabricated from porous filter cloth 12 (Unilayer 270), available from Midwest Filtration Company, Cincinnati, Ohio. The filter cloth was a 6-ply sonic bonded polypropylene laminate having a thickness of 22 mils (0.5588 mm), a weight of 91.6 g/m$^2$, an air permeability of polypropylene 635 l/m$^2$/sec and a Mullen Burst strength of 80 psi. The porous filter cloth fabricated from polymeric fibers allows the transmission of water, and the release of gases while precluding the blockage of pores by the solid reactants and/or products owing to its depth loading characteristics. An 8"×11" sheet of the filter cloth was used to fabricate bag 10 for containment of milled $Mg/MnO_2$ reaction mixture 20 supra. It should be appreciated that as described infra bag 10 may be constructed in a variety of ways. For example, filter cloth 12 may be constructed from a single layer of 6-ply sonic bonded polypropylene laminate as shown in FIG. 1, or filter cloth 12 may be a dual layer bag consisting of two different filter cloth materials such as polyester fibers for one layer and polypropylene fibers for another layer, and either layer may be the inner or the outer layer of bag 10. Additionally, filter cloth 12 may be constructed from multiple layers of polyester fibers, e.g., four to six layers, or may be constructed as a dual composite fabric consisting of an inner layer of spunbond/meltblown/spunbond filter media containing 100% polypropylene and an outer layer of a 3-ply bonded polypropylene fiber cloth. An example of such an inner layer is Unipro 260-SMS which is made of white spunbond/meltblown/spunbond filter media containing 100% polypropylene with a thickness of 19 mils (0.4826 mm) and a weight of 2.60 oz/yd$^2$ (91.96 g/m$^2$), with an air permeability of 17.1 cfm/ft$^2$ (86.9 l/m$^2$/sec) and a Mullen Burst of 71 psi. It should further be appreciated that the foregoing examples are within the spirit and scope of the claimed invention.

First, filter cloth 12 was cut into a 6"×8" sheet. The filter cloth was then made hydrophilic. One of two procedures and surfactants may be used in making the porous filter cloth hydrophilic. One method employs a "dip and nip" technique. This method requires taking the porous hydrophobic cloth and dipping it into a 5% aqueous solution of surfactant. The excess surfactant is then squeezed off by passing the cloth through a pair of nip rollers. The second method provides for applying a dab of Pluronic-25R2 surfactant, from BASF Corp., Florham Park, N.J., on one or both sides of the cloth.

Figure 2:
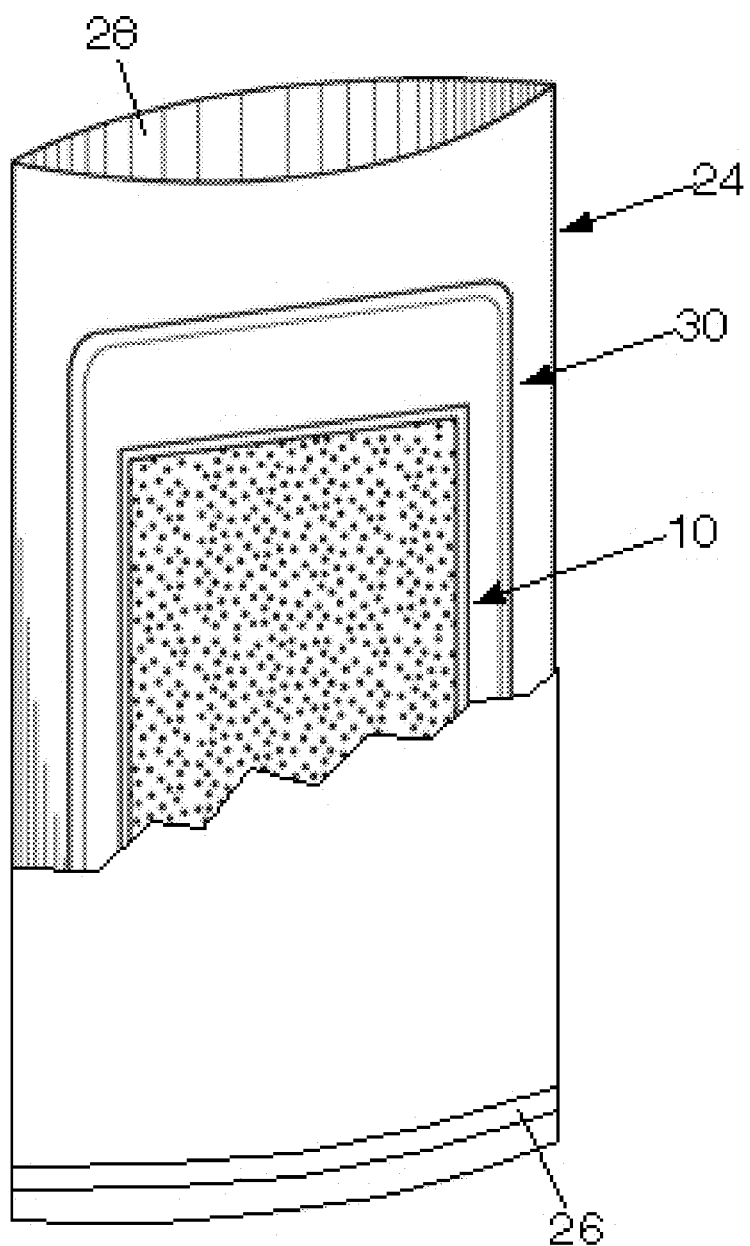
FIG. 2 is a partial isometric view of a flameless heater containment pouch with a portion of the front panel removed for an interior view of the pouch with the porous packet of heat generating powder and the food ration packet.
Figure 3:
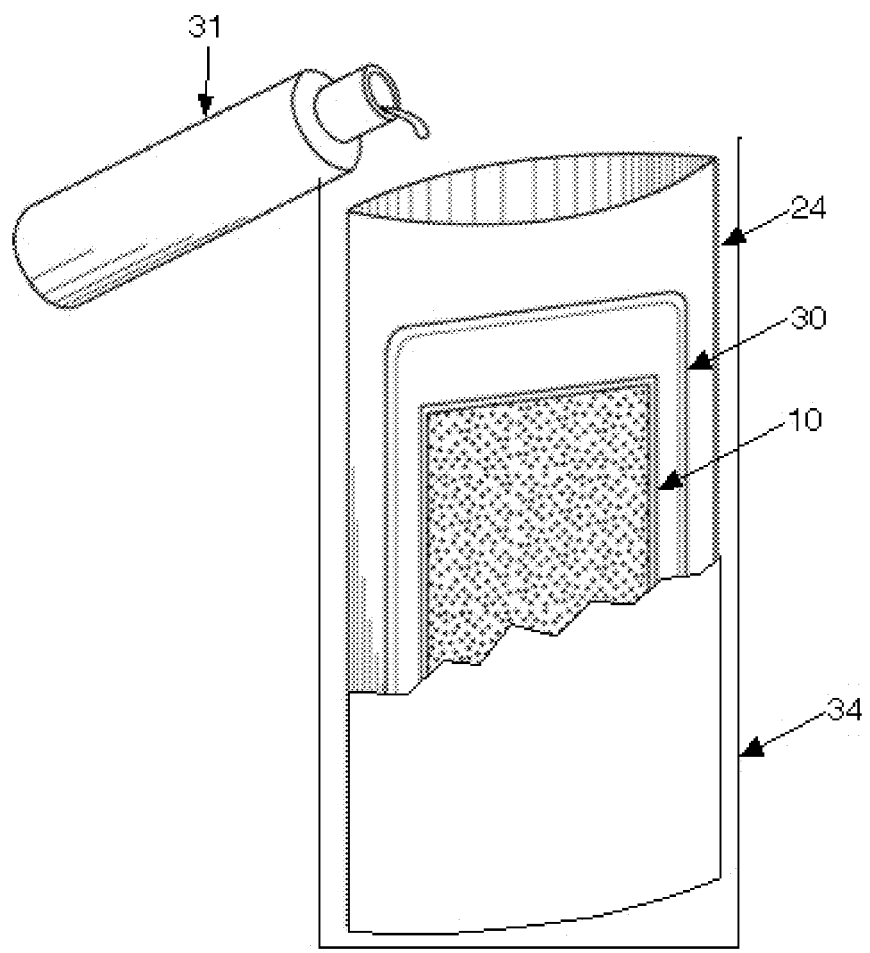
FIG. 3 is similar to that of FIG. 2, except the containment pouch has been placed in a containment box, and water is being introduced into the flameless heater containment pouch for initiating the generation of heat for heating the food packet in the pouch.

Hydrophilic porous filter cloth 12 was then fabricated into bag 10 by folding the treated 6"×8" sheet in half. The bottom 4" of side 14 and 6" of side 16 were heat sea form the pocket or bag 10 with opening 22 on the top 4" of side 18 left open to allow for filling before applying the final heat seal. The heat seals were made using a Uline 8" impulse Sealer (H-163). 100 g of the milled and dried $Mg/MnO_2$ powder 20 described supra was then placed in the Unilayer 270 polypropylene bag 10 and opening 22 on the top sealed closed. This sealed flameless ration heater reaction mixture bag 10 was then placed in green non-porous "poly" bag 24 (FIG. 2) having bottom closure seal 26 and upper opening 28. Poly bag 24, fabricated with a polypropylene film, had a capacity sufficient for also holding 250 g of water as "water test pouch" 30 used as a surrogate for a regular food ration packet. Poly bag 24 containing the reaction mixture bag 10 and water test pouch 30 were placed in "chipboard box" 34 (FIG. 3).

Figure 4:
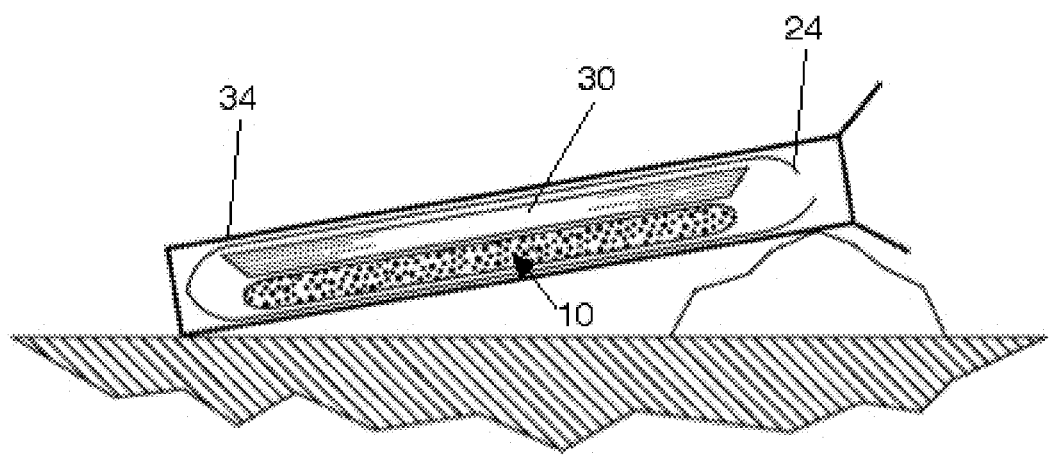
FIG. 4 is a side elevational view of the containment box with a sidewall of the box removed to show the arrangement of the flameless heater pouch with sealed food ration packet in the pouch like that of FIG. 3, and with water added, wherein the box is propped up at the open end to assure the water remains in contact with the porous packet of heat generating powder.

60 ml of water 31 (FIG. 3) were then added to green poly bag 24 on the same side as the ration heater and the top of bag 24 was folded over (not shown). The green poly bag, and its contents in "chipboard box" 34 (FIG. 4) were held substantially horizontally with the ration heater/reaction mixture bag 10 below water test pouch 30. After 30 seconds, the system was set at a slight incline (FIG. 4), to prevent water loss, and allowed to react for 30 minutes. The temperature variation was recorded as a function of time and shown in FIG. 5, and labeled 50.

Example 2

In order to compare the performance of the hydrogen suppressing, flameless heat generating composition prepared according to Example 1, a second sample of the known flameless heat generating composition comprising Mg and $H_2O$ only was prepared.

8 g of 500μ Mg/Fe, from Innotech Products, Inc., Cincinnati, Ohio as presently used in a U.S. Army ration heater, was prepared according to the recipe in U.S. Pat. No. 5,611,329. This sample was placed in a "non-woven" bag material from Innotech Product, Inc. The Innotech bag material was a roll configured into four, 1" compartments distributed through the length of the roll. 6" of this material was cut from the roll and the bottom was heat sealed with a Uline, 8" impulse sealer (H-163). Each of the four compartments was filled with 2 g of the Mg/Fe and the ration heater was heat sealed closed (not shown).

The completed flameless ration heater was placed in a green polyethylene bag, from the U.S. Army, with a 250 g water pouch. After thirty seconds, 40 ml of an aqueous solution of 0.25 M sodium chloride was poured between the water pouch and the flameless ration heater. The top of the green bag was folded over and the green bag with its contents was placed in a "chipboard" box (not shown). For approximately 30 seconds, the box system was held horizontally with the ration heater at the bottom. Then, the system was set at a slight incline to prevent water loss, and allowed to react for 30 minutes. The temperature variation was recorded as a function of time and shown in FIG. 5, labeled 52.

Figure 5:
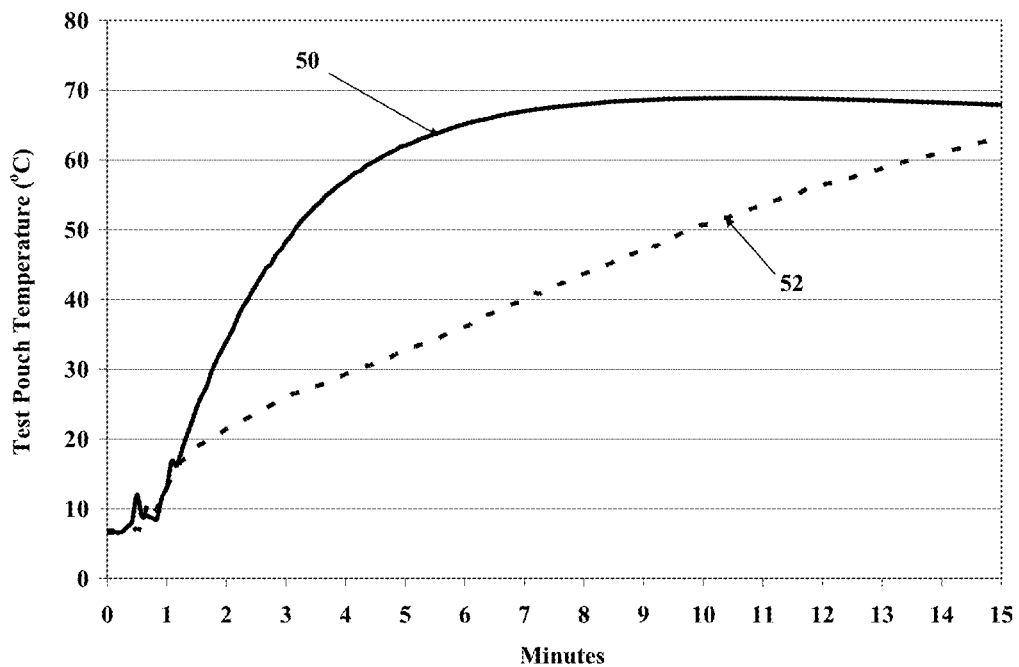
FIG. 5 is a plot illustrating the rate of temperature rise of a flameless heat generating composition relative to the rate of temperature rise of a known composition.

FIG. 5, which plots test pouch temperature relative to time (minutes), demonstrates a significantly faster and higher (steeper) heat elevation temperature occurring with the flameless heating Mg/Mn oxide reaction mixture prepared according to Example 1 relative to the known flameless heater composition of the prior art employing Mg/Fe reaction mixture without transition metal oxide (Example 2).

Example 2A 100 g of 500µ Mg/Fe, from Innotech Products, Inc., Cincinnati, Ohio, as presently used in a U.S. Army ration heater, was prepared according to the recipe set forth in U.S. Pat. No. 5,611,329. This sample was placed in an 8"×11" bag made from the "non-woven" bag material from Innotech Product, Inc., that was configured into four, 2" compartments distributed through the length of the roll. Each of the four compartments was filled with 25 g of 500µ Mg/Fe and the ration heater was heat sealed closed.

This completed ration heater was placed in a UGR-E heating tray, over which a 3500 g "water pouch" was placed. This assembly was placed in a card board box and then 330 ml of 1.5% NaCl solution was added. The card board box was then closed and the edges sealed with a tape. The temperature variation was recorded as a function of time over a 60 m period, and shown in FIGS. 7 and 8, labeled 54.

Example 3

In order to demonstrate a further embodiment of a chemical heater composition which includes a metal halide activator, a further experiment was performed with the reactants: $Mg+MnO_2+MgCl_2$ by means of the following protocol.

The milling procedure for the $Mg/MnO_2$ mixture was the same as that stated in Example 1. 45 g of the milled $Mg/MnO_2$ mixture was mixed with 15 g of 325 mesh $MgCl_2$, from Sigma-Aldrich, Inc., St. Louis, Mo. This $Mg/MnO_2/MgCl_2$ mixture was placed in a dual layer bag consisting of two different filter cloth materials made of polyester fibers (Finon C305NW) and polypropylene fibers (Unilayer 270). Finon C305NW is made of polyester fibers with a thickness of 7 mils (0.1778 mm) and a weight of 50.9 g/m², with an air permeability of 1,778 l/m²/sec and a Mullen Burst of 50 psi. This dual layer configuration is essential with $Mg/MnO_2/MgCl_2$ mixtures to provide thermal stability to the bag via the polyester fabric and the depth loading characteristic via the polypropylene, 6-ply, Unilayer. Both of the bag materials from Midwest Filtration were received in 8"×11" sheets and cut into 6"×8" sheets. To make these materials hydrophilic, the "dip and nip" process of Example 1 was employed. To configure the pouch, the Finon polyester material was placed aside the smooth surface of the Unilayer polypropylene and both are folded in half to make a 4"×6" pouch with the polyester inside the Unilayer polypropylene (not shown). A Uline 8" impulse Sealer (H-163) was used to heat seal the two materials together. The 6" side, parallel to the fold and one of the 4" sides were sealed prior to adding the reaction mixture. An additional seal, parallel to the 6" side and down the center of the pouch was also added to make the pouch into two compartments. 30 g of the $Mg/MnO_2/MgCl_2$ mixture was added to each of the compartments. The pouch was heat sealed closed and placed in a green "polybag" with a 250 g water test pouch as a surrogate for a ration. 40 ml of water was added to the green bag on the same side as the ration heater. The top of the bag was folded over and the whole system was placed in a "chipboard" box. For approximately 30 sec, the box was held horizontally with the ration heater under the water pouch. Then the pouch was set at a slight incline for thirty minutes, as in Example 1. The temperature variation was recorded as a function of time and shown in FIG. 6, and labeled 56.

Figure 6:
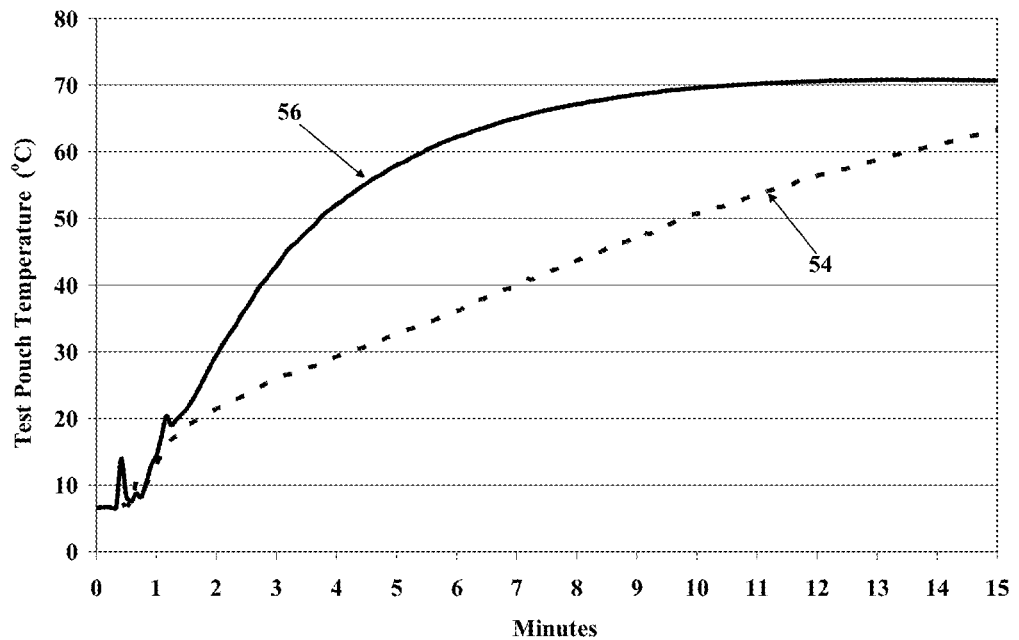
FIG. 6 is a further plot of the rate of temperature rise of another flameless heat generating composition relative to the rate of temperature rise of a known composition.

The performance of the FRH composition of the Example 3 was also tested relative to the Example 2 with the results demonstrated by FIG. 6 of the drawings.

FIG. 6 illustrating the performance of the FRH composition (Example 3) comprising Mg and $MnO_2$, plus $MgCl_2$ activator also provided a significantly faster and higher (steeper) rise in the generation of thermal energy relative to the known flameless heater composition of the prior art employing Mg/Fe reaction mixture without transition metal oxide (Example 2).

Bag Materials

As described above, bag 10 may be constructed in a variety of ways. As set forth in Example 1, bag 10 may be fabricated from porous filter cloth, such as Unilayer 270. In this example, the filter cloth is a 6-ply sonic bonded polypropylene laminate. Additionally, as set forth in Example 3, a dual layer bag consisting of two different filter cloth materials may be fabricated from polyester fibers, such as Finon C305NW, and polypropylene fibers, such as Unilayer 270. Furthermore, it has been found that bag 10 may also be fabricated from multiple layers, e.g., four to six layers, of polyester fibers, such as Finon C305NW. Similar to the previously described fabrications, the multiple layers can be sonically bonded and made hydrophilic by the "dip and nip" process of Example 1. Each of these fabrications provides varying levels of thermal stability and depth loading capability so that fine particles are prevented from blocking the pores and preventing entry of water from outside to the reactants inside the bag material. In the dual layer configuration, the polyester fiber provides thermal stability to the bag while the polypropylene provides the depth loading characteristic. Moreover, porous filter cloth fabricated from polymeric fibers allows the transmission of water, and the release of gases while precluding the blockage of pores by the solid reactants and/or products owing to its depth loading characteristics.

Figure 7:
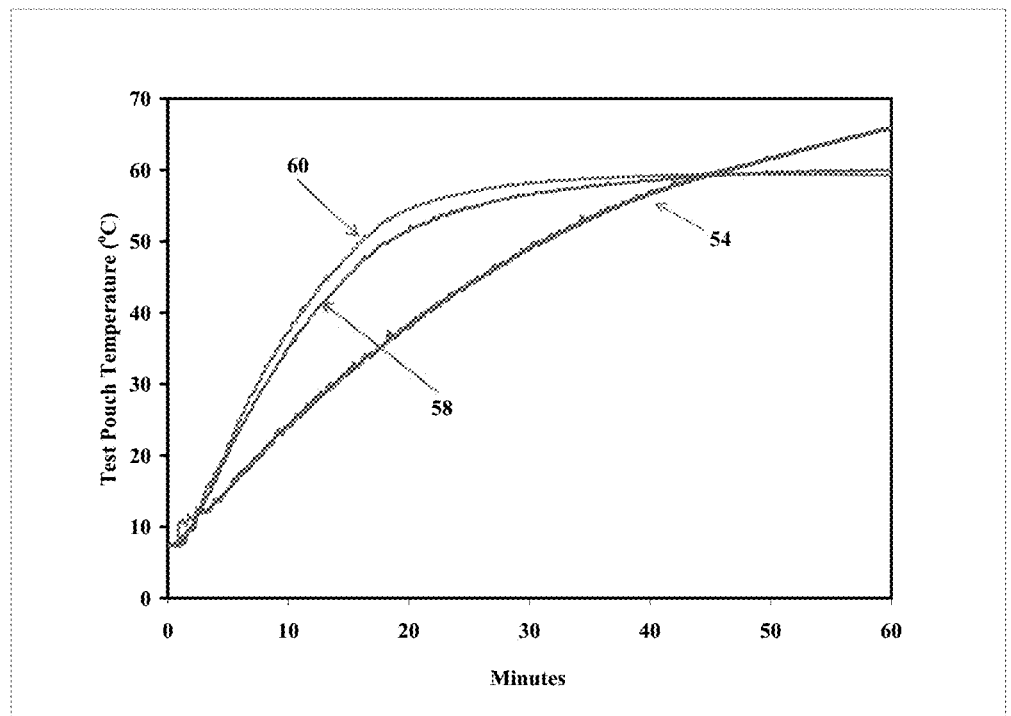
FIG. 7 is a further plot of the rate of temperature rise of additional flameless heat generating compositions relative to the rate of temperature rise of a known composition.
Figure 8:
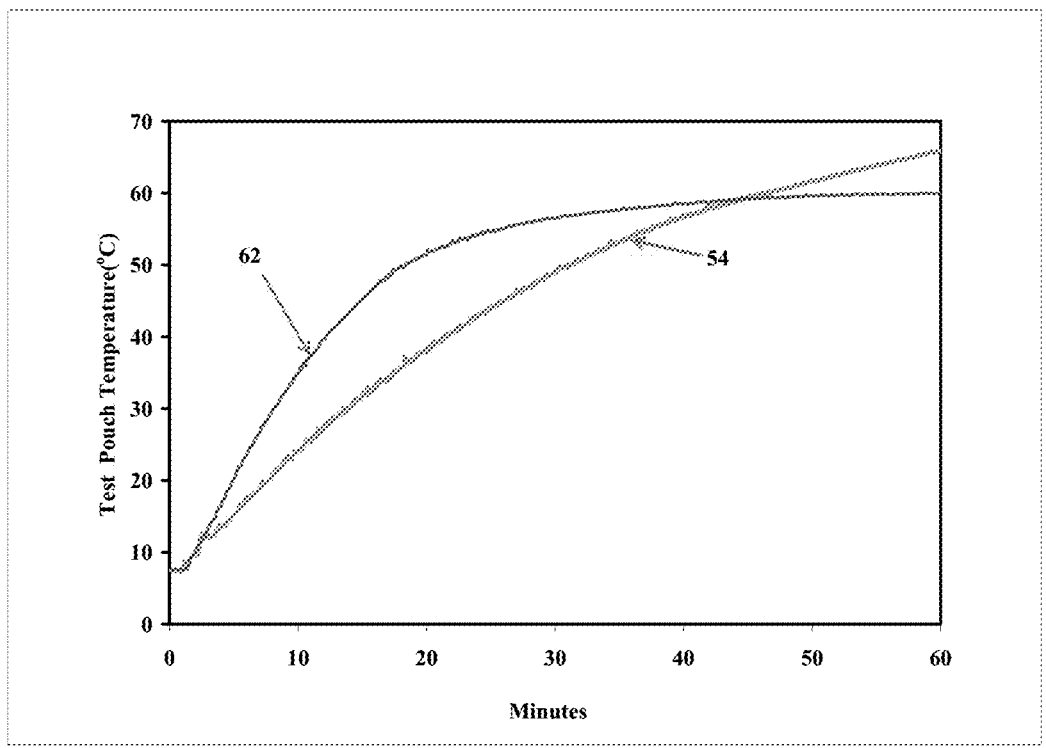
FIG. 8 is a further plot of the rate of temperature rise of yet another flameless heat generating composition relative to the rate of temperature rise of a known composition.

It has been found that with when Unilayer-based ration heater pouches are used in combination with the present invention, a very small seepage of carbon and/or $MnO_2$ fines occurs before and after the reaction. Such leakage leads to an unappealing aesthetic appearance of the heater and stains the hands of the person handling the heater. It has been found that these issues may be eliminated by employing a dual composite fabric consisting of an inner layer of 1.5 oz, Unipro 260-SMS (spunbond/meltblown/spunbond filter media containing 100% polypropylene), and an outer layer of Unilayer 135 which is a 3-ply bonded polypropylene fiber cloth. The temperature-time profiles of the present invention in combination with the Unilayer 270 and the Unilayer 135/Unipro-SMS arrangements described above are shown in FIG. 7 and labeled 58 (Unilayer 270) and 60 (Unilayer 135+Unipro-SMS), respectively. The foregoing examples depicted in FIG. 7 are shown with an UGR-E heater, and the test procedure is set forth in Example 20 below. A prior art example is also shown in FIG. 7 and labeled 54. It has been found that use of the above described Unilayer 135/Unipro 260-SMS fabric not only improved the heating rate, but also effectively precluded leakage of carbon and/or $MnO_2$ fines.

Hydrogen Generation

The amount of hydrogen generated by the FRH reaction mixtures of Examples 1, 3 and 20 was measured on a comparative basis with the FRH reaction mixture of the prior art (Example 2) by collecting off-gases and analyzing for hydrogen content by means of gas chromatography. The results are provided in Table 1 below:

TABLE 1

| Example | Solid Reactants | Liquid Reactants | Hydrogen Suppression |
|---|---|---|---|
| 1 | $Mg/MnO_2$ | Water | 99% |
| 2* | Mg/Fe | Water + NaCl** | 0% |
| 3 | $Mg/MnO_2/MgCl_2$ | Water | 94% |
| 20 | $Mg/MnO_2/C$ | Water | 97.1% |
|  |  |  | 99.7% |
| 20*** | $Mg/MnO_2/C$ | Water + NaCl | 98.9% |

*Results same as Mg/Fe/NaCl (0.6 g) + Water
**Water containing 40 g $H_2O$ + 0.6 g NaCl
***Same composition as Example 20, however liquid reactant is water having 1.5% NaCl Example 4

The following example demonstrates the method for removing residual moisture (3.3% $H_2O$) from electrolytic manganese dioxide to near zero level for improving useful shelf-life of the reaction mixture.

In performing the process, 500 g of $MnO_2$ is placed in an oven set to 400° C. for 2 hours and then heated at 110° C. for 24 hours. This $MnO_2$ sample is mixed with Mg powder and milled following the procedure disclosed in Example 1. The remaining steps of the process correspond to those disclosed in Example 1, containing $Mg+MnO_2$.

Example 5

The following example demonstrates the method for removing residual moisture (3.3% $H_2O$) from electrolytic $MnO_2$ to near zero level in preparing a reaction mixture comprising Mg and $MnO_2$ (water-free), plus $MgCl_2$ activator for improving useful shelf-life of the reaction mixture.

In performing the process, 500 g of $MnO_2$ is placed in an oven set to 400° C. for 2 hours and then heated at 110° C. for 24 hours. This $MnO_2$ sample is then mixed with Mg powder and milled following the procedure in Example 1. The remaining steps of the process are the same as those disclosed in Example 3, containing $Mg+MnO_2+MgCl_2$.

Example 6

The following example was performed to demonstrate the procedure for preparing a homogeneous reaction mixture that maximizes electrical contact of all the $MnO_2$ with Mg in the reaction mixture.

In performing the process, 300 g of 60μ $\gamma$-$MnO_2$, from Tronox, LLC, was mixed with the Mg powder and milled according to the procedure in Example 1. The remaining process steps corresponded to those disclosed in Example 1.

Example 7

The following example was performed to demonstrate the procedure employed in preparing a reaction mixture comprising $Mg+MgCl_2$ with small particle size (60μ) $MnO_2$.

In performing the process, 300 g of 60μ $\gamma$-$MnO_2$, from Tronox, LLC, was mixed with Mg powder and milled following the procedure in Example 3. The remaining steps are the same as that described in Example 3.

Example 8

The following example demonstrates preparation of a reaction mixture according to present invention comprising magnesium with manganese dioxide except with very small average particle size of 0.8μ.

In performing the process, 300 g of 0.8μ $MnO_2$ available from Sigma Aldrich can be mixed with Mg powder and milled following the procedure in Example 1, above. The remaining steps of the process can follow those disclosed in best mode Example 1.

Example 9

The following example also demonstrates preparation of a flameless heater reaction mixture according to the present invention, but with ultra fine particulates of $MnO_2$ (0.8μ $\gamma$-$MnO_2$) hydrogen suppressant, plus $MgCl_2$ activator.

In preparing the reaction mixture, 300 g of 0.8μ $MnO_2$, from Sigma Aldrich, is mixed with Mg powder and milled following the procedure of Example 3, above. The remaining steps for preparation of the reaction mixture correspond to those also described in best mode Example 3.

Example 10

The following best mode example also demonstrates a further aspect of the invention except the improved flameless heater composition is prepared with two (2) times the stoichiometric amount of manganese dioxide.

In preparing the composition, 600 g of $MnO_2$ from Tronox, LLC, is mixed with Mg particles and milled as described in working Example 1, supra. The remaining steps correspond to those also described in Example 1.

Example 11

The following best mode example also demonstrates a further aspect of the invention for preparing flameless heater compositions prepared with two (2) times the stoichiometric amount of manganese dioxide in combination with magnesium chloride activator.

In preparing the reaction mixture/composition, 600 g of $MnO_2$ from Tronox, LLC, is mixed with the Mg particles and milled in Example 1. The remaining steps correspond to those also described in Example 3.

Example 12

The following example demonstrates a further alternative embodiment of the invention comprising for $Mg+MnO_2+1\%$ $Zn°$ metal, wherein an additional alloying metal, i.e., zinc, is introduced into the composition to form surface alloyed magnesium metal particulates during the milling step.

In preparing the reaction mixture/composition, 500 g of 300μ $MnO_2$ (same as the $MnO_2$ disclosed in Example 1, procedure for Mg+$MnO_2$), 69.44 g of 500μ Mg (same as the Mg° described in Example 1 procedure for Mg+$MnO_2$) and 5 g Zn° particles, from Sigma Aldrich with a purity of 99.99%, were combined, placed in the VKE mill and milled for 6 hours. The remaining procedure is the same as that described in Example 1, procedure for Mg°+$MnO_2$.

This inventor found that the milling process is effective for: (i) mixing the ingredients to form a homogeneous reactive composition; (ii) assures desired intimate electrical contact between the ingredients, i.e., Mg+$MnO_2$+Zn° metal; (iii) is an effective means of forming surfaces alloyed with added metals, such as zinc, cobalt, nickel, iron, aluminum and mixtures of the same; and, (iv) also promotes better surface adhesion of the $MnO_2$ to the magnesium or alloyed magnesium.

Example 13

This example discloses a flameless heating composition of the invention comprising a combination of both oxides of manganese and ruthenium in a 30% $RuO_2$, 70% $MnO_2$ proportional range.

In preparing the composition, 48.61 g of 500μ Mg (same as disclosed in Example 1), 350 g of 300μ particle size of $MnO_2$ (same as the $MnO_2$ disclosed in Example 1 procedure for Mg+$MnO_2$) and 150 g $RuO_2$, 99.99% pure from Sigma Aldrich (12036-10-1), were combined, placed in the VKE mill and milled for 6 hours. The remaining procedure is the same as that described in Example 1.

Example 14

This example discloses a flameless heating composition of the invention similar to Example 13, except the combination of oxides of manganese and ruthenium have been reversed wherein $RuO_2$ is present in 70% range, and the $MnO_2$ is present in a proportional range of 30%.

In preparing the composition, 20.83 g of 500μ Mg (same Mg disclosed in Example 1 and the procedure for milling Mg+$MnO_2$), 150 g of 300μ of $MnO_2$ (same $MnO_2$ disclosed in Example 1 and milling procedure for Mg+$MnO_2$ in Example 1) Mg, and 350 g $RuO_2$ (same as the $RuO_2$ described in Example 13, Mg+30% $RuO_2$+70% $MnO_2$), were combined, placed in the VKE mill and milled for 6 hours. The remaining procedure is the same as that disclosed in Example 1.

Example 15

This best mode example demonstrates a flameless heating composition of the invention comprising $RuO_2$ as the sole hydrogen suppressing agent.

In preparing the composition, 45.50 g of 500μ Mg (same as the Mg disclosed in Example 1) and 500 g $RuO_2$, (same as the $RuO_2$ disclosed in Example 13), were combined, placed in the VKE mill and milled for 6 hours. The remaining procedure is the same as that described in Example 1.

Example 16

This example demonstrates a further embodiment of the invention wherein the flameless heater mixture includes in addition to Mg and $MnO_2$, 10% by-weight carbon to promote the rate of reaction and the generation of heat.

In preparing the reaction mixture/composition, 69.44 g of 500μ Mg (Same type of Mg disclosed in Example 1), 500 g $MnO_2$ (same as the $MnO_2$ disclosed in Example 1) and 50 g carbon from Cabot Corp., Boston, Mass., available under the trademark Vulcan XC72R, Lot: GP-3860 were combined and placed in the VKE mill and milled for 6 hours. The remaining procedure for this composition follows the same protocols as disclosed in Example 1, above.

Example 17

A further embodiment of the invention is presented wherein 1% $Na_2S$ is introduced into the flameless heater composition Mg+$MnO_2$ composition as a hydrogen overvoltage suppressor. A metal sulfide may be incorporated into the composition as a fail safe in the event hydrogen is unexpectedly generated.

The flameless heater composition was prepared by mixing 69.44 g of 500μ Mg (same Mg disclosed in Example 1), 500 g of $MnO_2$ (same $MnO_2$ disclosed in Example 1) and 5 g $Na_2S$ (from Sigma Aldrich), and placing the mixture in the VKE mill and milling for 6 hours. The remaining procedure corresponds to that described in Example 1, above.

Example 18

Another embodiment of the flameless heater compositions of the invention includes the introduction of a filler/flowing agent, such as 2% $SiO_2$ to the magnesium/manganese dioxide.

This embodiment may be prepared by combining 69.44 g of 500μ Mg (the same Mg disclosed in Example 1) with 500 g $MnO_2$ (the same $MnO_2$ disclosed in Example 1) and 10 g of 20μ $SiO_2$ (from Sigma Aldrich, purity=99.5%) and placing the mixture in the VKE mill and milling for 6 hours. The remaining procedure for preparing corresponds to that disclosed in Example 1.

Example 19

A similar flameless heater composition to that of Example 18 may be prepared using 2% $CaCO_3$ filler/flowing agent with the magnesium and manganese dioxide.

The reaction mixture/composition may be prepared by combining 69.44 g of 500μ Mg (same Mg as disclosed in Example 1), 500 g $MnO_2$ (same $MnO_2$ as disclosed in Example 1) and 10 g of 20μ $CaCO_3$ (from Sigma Aldrich, purity=99.0%), and placing the mixture in the VKE mill and milling for 6 hours. The remaining procedure corresponds to that described in Example 1.

Example 20

A 99.98% pure magnesium powder of 200-300μ particle size from Superior Metal Powders and containing 60 ppm Al, 50 ppm Cu, 300 ppm Fe, 700 ppm Mn, 50 ppm Si, 50 ppm Zn and 80 ppm Sn was used in this test. The 70-80μ γ-$MnO_2$, from Tronox, LLC, with a purity of 99% and contained 1.2% $SO_4^{2-}$, 2600 ppm Na, 190 ppm Al, 310 ppm C, 35 ppm Fe and 400 ppm K. These two materials were used to make a batch sample, in a stoichiometric ratio according to Equation [1] above, along with 5% Asbury 4827 carbon, a synthetic graphite of <20-<30μ particle size, containing 1440 ppm Al, 865 ppm Ca, 2150 ppm Fe, 300 ppm Mg, 200 ppm Na and 2900 ppm Si.

Approximately 1100 g of a mixture containing 919.2 g $MnO_2$, 52.2 g C and 130 g Mg was weighed and placed in the Vibrokinetic Energy (VKE) Mill, from Microgrinding System, Inc., model 624 (diameter=6" and tube length=24"). This mill is run with 36 stainless steel rods (6 with a diameter=1", 30 with a diameter=7/16") with a length of 24" as a stainless steel rod. The sample mixture is loaded into the mill via the 2" diameter feed. All screws and openings are tightened and secured prior to running the mill for 1.5 hours. At the end of 1.5 hours, the sample is left in the mill for 20 minutes to cool. The sample is removed with a Nalgene scoop, transferred to a 1000 ml stainless steel beaker and stored in a desiccator with calcium sulfate as the dehydrating agent.

A Unilayer 270 bag material from Midwest Filtration is used to contain the milled $Mg/MnO_2$ mixture. First, the bag material is cut into a 16.5"×11" sheet and folded in half to make a 8.25"×11" bag. Prior to adding the sample, one of the 8.25" sides and the 11" side is heat sealed to form a pocket. The task is done with a Uline, 8", Impulse Sealer (H-163). 450 g of the milled $Mg/MnO_2$ mixture is placed in the Unilayer Pocket and sealed closed. This completed ration heater is placed in a UGR-E tray, over which the 3500 g "water pouch" is placed. This assembly is placed in a card board box and then 350 ml of water is added. The card board box is then closed and the edges sealed with a tape. The temperature variation was recorded as a function of time over a 60 minute period, and is presented in FIG. 8. The results of the mixture of this Example is labeled 62, while the results of a prior art mixture is labeled 54.

Figure 9:
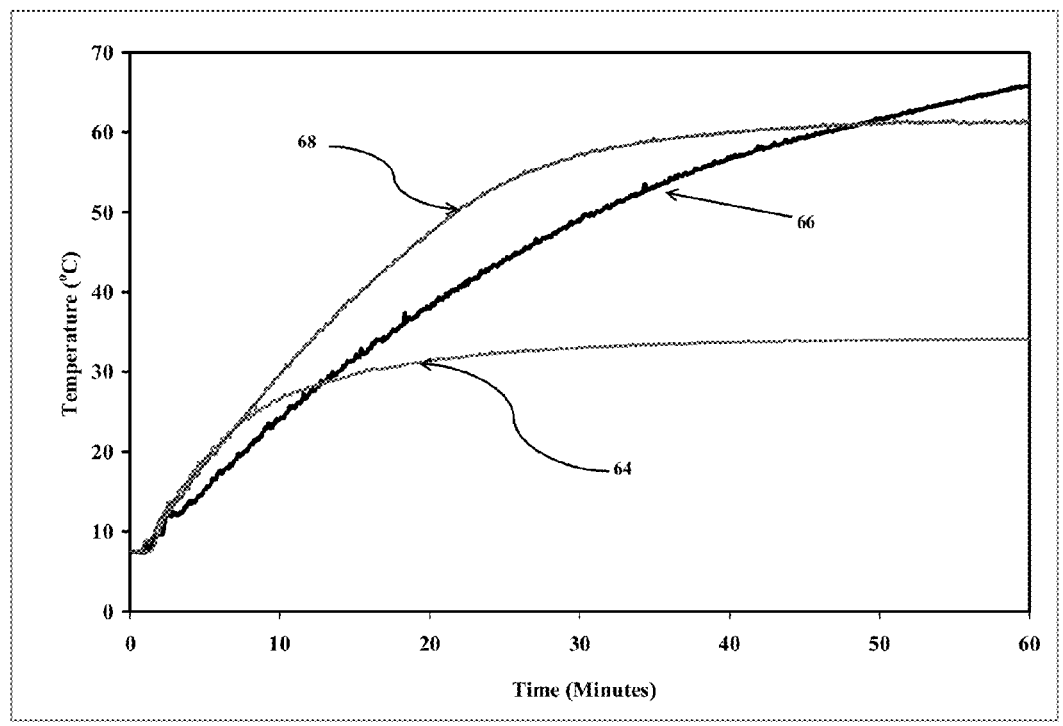
FIG. 9 is a further plot of the rate of temperature rise of three different chemical heater compositions each activated using a water and NaCl solution.

The reaction set forth in Equation [2] above suppresses hydrogen; however, it does not proceed to provide as much heat as the composition set forth in the instant invention. See for example, the results labeled 64 on FIG. 9. Equation [2] has been found to be less than 50% efficient, needing more than 1 kg of reactants to obtain the same quantity of heat as provided by 100 g of Mg according to Equation [1]. The heat generated according to Equation [1] is shown in the results labeled 66 on FIG. 9. Thus, when proceeding according to Equation [2], an additive, such as carbon, is required in order to obtain a quantity of heat which is similar to the heat produced via the reaction of Equation [1]. This effect is shown in the results labeled 68 in the graph set forth in FIG. 9.

Figure 10:
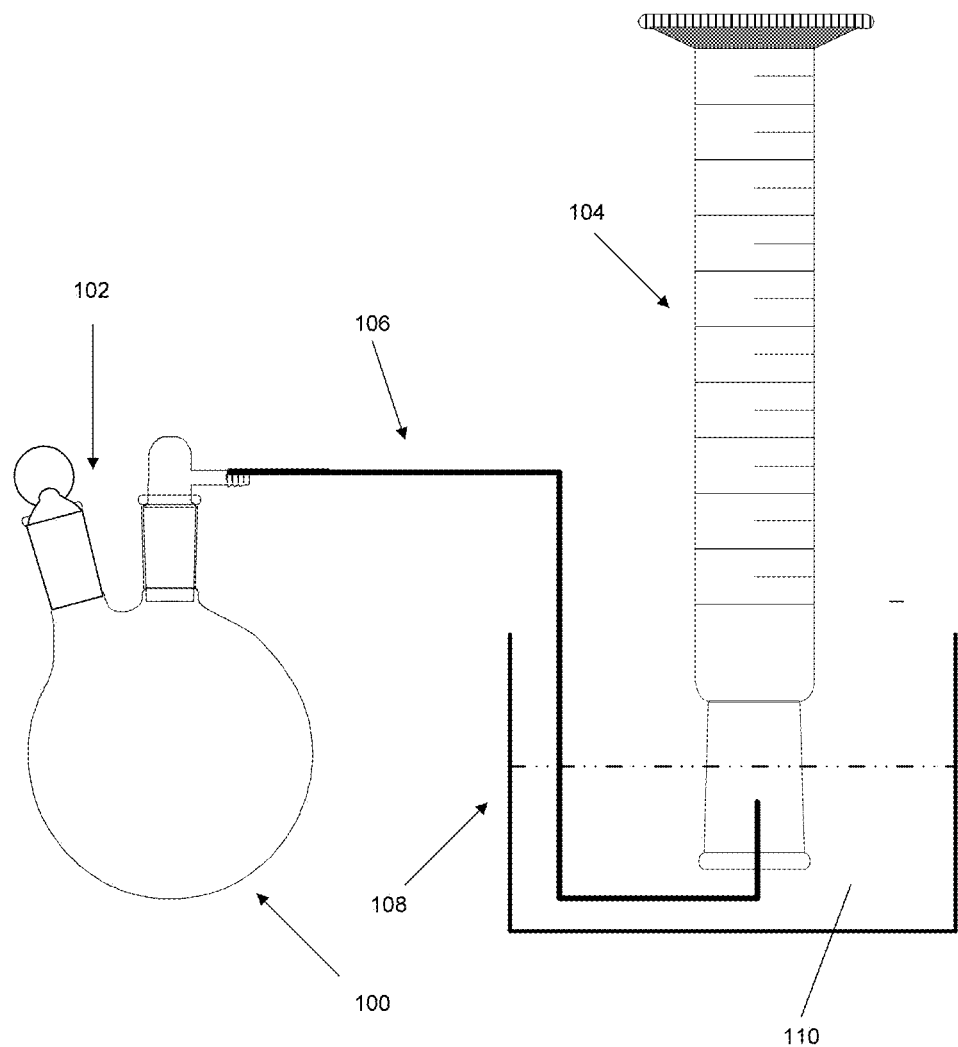
FIG. 10 is a diagram of an apparatus arranged to measure the generation of hydrogen by chemical heater compositions.

As described above, reactions of $Mg+MnO_2$ with water can proceed via either Equation [1] and/or Equation [2] to provide heat. The reaction which dominates the generation of heat can be determined by measuring the amount of hydrogen generated during the course of the reaction using the setup shown in FIG. 10. The reaction mixture of $Mg+MnO_2$ with water proceeds in double necked round bottom flask 100, e.g., a 250 ml double necked round bottom flask. Temperature measurements are obtained by placing a thermocouple within the reaction mixture via opening 102, for example, and the data is gathered manually or via a data acquisition system, e.g., Fluke Hydra data acquisition program interfaced with a computer. Gases generated during the reaction passes from flask 100 to inverted graduated cylinder 104 via connection 106. Cylinder 104 is filled with water and placed within reservoir 108 as shown in the FIG. 10. Reservoir 108 is filled with water 110 whereby the water is maintained in cylinder 104 until such time as gases pass from flask 100 to cylinder 104. As gases are introduced to cylinder 104, water contained therein is displaced. The amount of hydrogen generated by the reaction is calculated from the volume and composition of gases in flask 100 and cylinder 104. Table 2 below shows the data gathered for several examples reaction mixtures.

TABLE 2

| System | Maximum Temperature (° C.) | % Hydrogen generated[1] |
|---|---|---|
| $Mg + H_2O$ | 60 | 100 |
| $Mg + MnO_2 + H_2O$ | 30 | 15 |
| $Mg + MnO_2 + C + H_2O$ | 60 | 50 |

[1]Percent hydrogen evolved compared to percent hydrogen expected if all the Mg had directly reacted with $H_2O$ It has been found, according to the data set forth in Table 2, that the reaction mixture which includes $Mg+MnO_2$ does proceed as dictated by thermodynamics, but not at a rate that is needed to heat rations with a comparable weight of Mg. Therefore, the temperature has not reached a desirable value, e.g., 60° C. However, even under these conditions, a reaction according to Equation [1] is occurring, as evidenced by the amount of $H_2$ generated. It has been further found that when carbon is included in the reaction mixture, i.e., $Mg+MnO_2+C$, heat is produced as a result of the reactions set forth in both Equations [1] and [2]. This is evidenced by the amount of $H_2$ produced. The reaction of Equation [1] is a parallel reaction occurring during the course of the reaction of Equation [2]. It is believed that the reaction of Equation [1] can be suppressed by: a) blocking the Mg reaction sites thereby preventing the reaction of Mg with water from the bulk; and/or, b) consuming the hydrogen as it is formed. The foregoing means for suppressing the reaction of Equation [1] are discussed here below.

The Mg reaction sites can be blocked by forming insoluble Mg species on the Mg sites as the reaction of Mg with water is initiated. The individual steps involved in the reaction of Equation [1] are as follows:

$$Mg \rightarrow Mg^{2+}+2e \quad [3]$$

$$2H_2O+2e \rightarrow H_2+2OH^- \quad [4]$$

The insoluble species of Mg include but are not limited to magnesium silicate, magnesium bicarbonate, magnesium phosphate, magnesium borate, magnesium perborate, magnesium percarbonate, magnesium perphosphate and magnesium persulfate. Thus, when sodium salts of anions such as silicate, carbonate, bicarbonate, phosphate, borate, perborate, percarbonate, perphosphate and persulfate (individually or in combination) are added to the $Mg+MnO_2+C$ mixtures, these anions combine with $Mg^{2+}$ formed via Equation [3] to form insoluble Mg compounds on Mg reaction sites. As a result, the reaction of Equation [3] is pushed in the reverse direction, which in turn suppresses the reaction of Equation [4]. Since the reaction of Equation [1] is suppressed, the reaction of Equation [2] proceeds without hindrance, since the reaction of Equation [2] is a surface reaction. It should be noted that Equation [2] is an electrochemical corrosion reaction wherein the anodic reaction is the oxidation of Mg to form $Mg^{2+}$ ions, the cathodic reaction is the reduction of $MnO_2$ to $Mn_2O_3$ and the electron transfer processes proceed on the surface of $MnO_2$. It should be emphasized that alkali and alkaline earth salts with anions such as chloride, bromide, fluoride, hydroxide, acetate, citrate, etc., will not suppress the hydrogen evolution reaction because they do not form insoluble films of Mg on the Mg surfaces. The foregoing sodium salts may be added to the present invention composition as an activating solution/fluid, or alternatively, the salts may be added to the composition as a dry component, wherein the salts dissolve upon the introduction of water to the composition. Moreover, the sodium salts may be added individually or as a combination of a plurality of salts.

Example 21

A 99.98% pure magnesium powder of 200-300µ particle size from Superior Metal Powders and containing 60 ppm Al, 50 ppm Cu, 300 ppm Fe, 700 ppm Mn, 50 ppm Si, 50 ppm Zn and 80 ppm Sn was used in this example. The 70-80µ γ-$MnO_2$ was from Tronox, LLC with a purity of 99% and contained 1.2% $SO_4^{2-}$, 2600 ppm Na, 190 ppm Al, 310 ppm C, 35 ppm Fe and 400 ppm K. These two materials were used to make a batch sample, in a stoichiometric ratio according to Equation [1] along with 5% Asbury 4827 carbon, a synthetic graphite of <20-<30µ particle size, containing 1440 ppm Al, 865 ppm Ca, 2150 ppm Fe, 2900 ppm Si, 300 ppm Mg, 200 ppm Na and 2900 ppm Si.

Approximately 1100 g of the mixture containing 919.2 g $MnO_2$, 52.2 g C, 130 g Mg was weighed and placed in the Vibrokinetic Energy (VKE) Mill, from Microgrinding System, Inc., Model 624 (diameter=6" and tube length=24"). This mill ran using 36 stainless steel rods (6 with a diameter=1", 30 with a diameter=7/16") with a length of 24" as a stainless steel rod. The sample mixture was loaded into the mill via the 2" diameter feed. All the screws and openings were tightened and secured prior to running the mill for 1.5 hours. At the end of 1.5 hours, the sample was left in the mill for 20 minutes to cool. The sample was removed with a Nalgene scoop, transferred to a 1000 ml stainless steel beaker and stored in a desiccator with calcium sulfate as the dehydrating agent.

Figure 11:
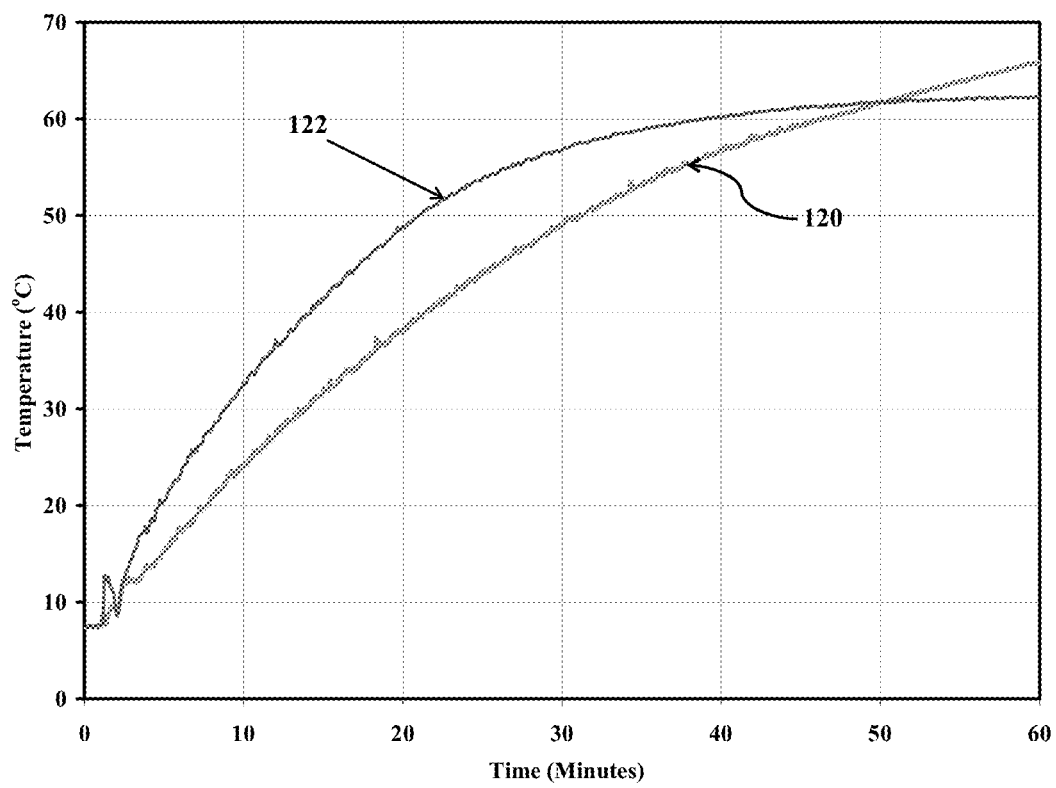
FIG. 11 is a plot of the rate of temperature rise of an embodiment of the flameless heat generating composition of the present invention relative to the rate of temperature rise of a known composition; and, FIG. 12 is a further plot of the rate of temperature rise of another embodiment of the flameless heat generating composition of the present invention relative to the rate of temperature rise of three other heat generating compositions.

A composite Unilayer 135/Unipro-SMS bag material from Midwest filtration was used to contain the milled Mg/$MnO_2$/C mixture. First, the bag material was cut into a 16.5"×11" sheet and folded in half to make a 8.25"×11" bag. Prior to adding the sample, one of the 8.25" sides and the 11" side is heat sealed to form a pocket. The task was done with a Uline 8" impulse Sealer (Model H-163). 450 g of the milled Mg/$MnO_2$/C was placed in the Unilayer Pocket and sealed closed. This completed ration heater was placed in a UGR-E tray, over which a 3500 g "water pouch" was placed. This assembly was placed in a card board box and then 350 ml of 2.3% sodium silicate water was added. The card board box was then closed and the edges sealed with a tape. The temperature variation was recorded as a function of time over a 60 minute period, and presented in FIG. 11. The results labeled 120 depict the performance of a mixture of Mg/Fe activated by 330 ml NaCl, while the results labeled 122 depict the performance of a mixture of Mg/$MnO_2$/C activated by 330 ml of 2.3% sodium silicate solution.

An analysis of the gases produced, following the methodology described earlier, showed the percent hydrogen evolved compared to that expected if all the Mg has directly reacted with $H_2O$ to be ~10%. This translates to approximately a 95% reduction in the amount of hydrogen generated when compared to a 110 g Mg/Fe heater that is presently used in UGR-E heaters.

Moreover, the hydrogen from the foregoing reactions can be consumed as it is formed. An alternate approach to suppress hydrogen generation is to react it as it is formed by oxidizing it to form protons as:

$$H_2 + 2e \rightarrow 2H^- \quad [5]$$

This scheme requires the presence of species that can be reduced. The reducible species are cations such as $Cu^{2+}$, $Ni^{2+}$ or anions such as nitrate, nitrite, ferrate, permanganate, and stannate. $Cu^{2+}$, $Ni^{2+}$ will be reduced to metallic Cu or Ni, which are carcinogenic and cannot come in contact with food products. The reducible species with perborate and percarbonate additions is $H_2O_2$ formed by the hydrolysis of these species. Tests have shown that nitrate and nitrite completely suppress $H_2$ generation, but the reduced product in both cases is ammonia which smells and hence is not acceptable with food products. Permanganate and ferrate are reduced to $MnO_2$ and $Fe^{3+}$, respectively. These species are colored and hence stain the bag material and the bottom of the food tray. While these suppressants can be used to prevent hydrogen evolution, they are not preferred because of aesthetic aspects, especially with foods and food products.

Example 22

This example comprises a comparison of a variety of compositions including the instant invention and several known compositions. The first composition includes: 4 g of a Mg/Fe mixture, 40.25 g of $CuCl_2$ (which is equivalent to 51 g of $CuCl_2.2H_2O$), 7.7 g of Citric acid and 34.2 g of sodium citrate which equals 86.15 g of total composition. This composition is Example 1 from U.S. Pat. No. 5,517,981 (hereinafter Taub). The second, third and fourth compositions each includes: 1.56 g of Mg, 11.18 g of $MnO_2$ and 2.25 g of carbon.

Figure 12:
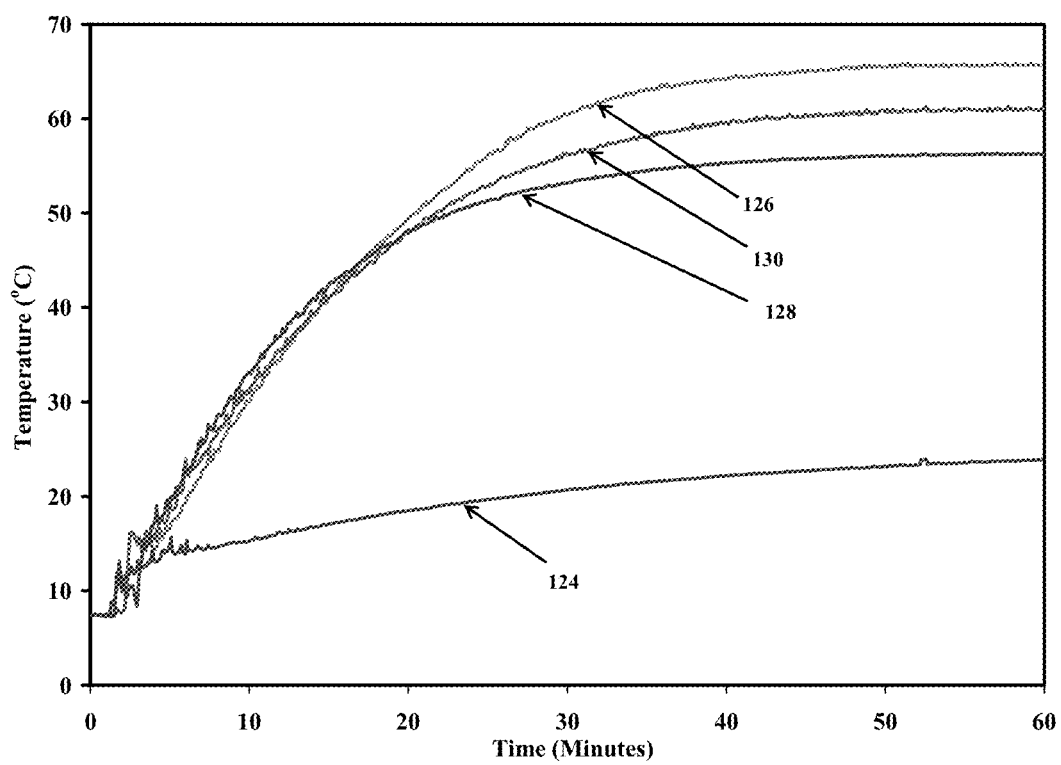

The first composition was activated with 11 mL of water, the second composition was activated with 11 mL of water having 1.5% NaCl, the third composition was activated with 11 mL of water and the fourth composition was activated with 11 mL of water having 2.3% sodium silicate. FIG. 12 shows the temperature versus time for each of the compositions. Line 124 shows the results of the first composition, line 126 shows the results of the second composition, line 128 shows the results of the third composition and line 130 shows the results of the fourth composition. The following table sets forth the performance of each composition.

TABLE 3

| Composition[1] | System | Activation Solution[2] | $H_2$ Expected (based on Mg reaction with $H_2O$) (mL) | $H_2$ (calculated based on volume measurements) (mL) |
|---|---|---|---|---|
| First | Taub Example 1 | $H_2O$ | 670 | 100 |
| Second | Mg/$MnO_2$/15% C | 1.5% NaCl | 1440 | 910 |
| Third | Mg/$MnO_2$/15% C | $H_2O$ | 1440 | 540 |
| Fourth | Mg/$MnO_2$/15% C | 2.3% $Na_2SiO_3$ | 1440 | 180 |

[1] All compositions used as 15 g samples
[2] All activation solutions include 11 mL of $H_2O$ It should be appreciated that the reaction of Taub provides heat according to the reaction of Equation [6].

$$Mg + CuCl_2 \rightarrow MgCl_2 + Cu \quad [6]$$

The reaction of Equation [6] has a heat of reaction of 101 kcal/mole verses 85.88 kcal/mole for the reaction of Equation

[1]. Moreover, the Taub reaction produces metallic Cu fines which block the cloth bag which houses the reaction mixture thereby preventing steam from getting out of the bag and which in turn heat the water pouch. As the water pouch is heavy, i.e., weighing approximately 3.5 kg, the steam was prevented from escaping to heat the water. Once the water pouch was removed, the bag expanded as the steam was not able to get out. Furthermore, the Taub composition developed blackish green color as the reaction proceeded making the heater bag appear undesirable. Lastly, the Taub composition results in Cu which is a known carcinogenic material and hence not permitted near food.

Lastly, it should be noted that the nature of the wetting agent employed to impart hydrophilicity to a given polymeric filter media and the manner in which it is applied impacts the temperature-time profile and the fines retention characteristics of the composite bag materials for housing the heater chemicals. Pluronic 25R2, a BASF product, which is a polyoxypropylene-polyoxypolyethylene block copolymer is generally used to wet polyester media. Eccowet D-75B, a product of Eastern Color & Chemical Company, which is a sodium sulfo-succinate solution in propylene glycol is used for polypropylene based media. It has been found that a proper wetting agent should be used for a given polymeric material, as otherwise, the heat generation profiles will be significantly altered.

Tests have also shown that the manner by which the wetting agents are applied to a given material makes a difference in the temperature profiles and the appearance of the heater bag after use. Pluronic is applied by lightly dabbing it on the bag with a brush or adding measured number of drops in select locations on the heater bag, whereas Eccowet is impregnated on the cloth by soaking it in a 1-5% solution of the wetting agent, squeezing the excess solution and drying it at 90-100° C. The procedure used for Eccowet is not applicable with Pluronic, since this leads to lowered temperature profiles and unacceptable seepage of black fines.

While the invention has been described in conjunction with various embodiments, they are illustrative only. Accordingly, many alternatives, modifications and variations will be apparent to persons skilled in the art in light of the foregoing detailed description, and it is therefore intended to embrace all such alternatives and variations as to fall within the spirit and broad scope of the appended claims.

What I claim is:

1. A hydrogen suppressing, flameless, heat generating chemical composition comprising:
    pure magnesium;
    a hydrogen suppressor or eliminator selected from the group consisting of: $\gamma$-$MnO_2$, oxides of ruthenium, PtO, $IrO_2$, $RhO_2$, $Fe_2O_3$, $Co_3O_4$, NiO, $Ag_2O$, $Au_2O_3$, $TiO_2$, $ZrO_2$, $HfO_2$, $Ta_2O_5$, $PbO_2$, and combinations thereof;
    particulate carbon;
    a hydrogen overvoltage suppressor;
    a flowing agent;
    a reaction activator selected from the group consisting of: alkali metal halides, magnesium halide salts, thermally and electrically conducting, high surface area synthetic graphite, conducting carbon, conducting graphite, carbon and mixtures thereof;
    a metallic salt comprising a cation, wherein said cation is selected from the group consisting of calcium, magnesium and potassium; and an anion, wherein said anion is selected from the group consisting of silicate, carbonate, bicarbonate, phosphate, borate, perborate, percarbonate, perphosphate, persulfate, nitrate, nitrite, ferrate, permanganate, and stannate and combinations thereof; and water, wherein said pure magnesium, hydrogen suppressor or eliminator, particulate carbon, hydrogen overvoltage suppressor, flowing agent, reaction activator, metallic salt and water are each present in a proportional amount to generate sufficient heat to heat water, medical supplies and/or consumable rations and the chemical composition is placed in a reaction mixture bag made to be hydrophilic by dipping said reaction mixture bag in an aqueous solution containing a surfactant or by applying a dab of said aqueous solution containing said surfactant on a side of said reaction mixture bag.

2. The hydrogen suppressing, flameless, heat generating chemical composition according to claim 1, wherein the hydrogen suppressor is $\gamma$-$MnO_2$ present in an amount ranging from 0.5 to 10 times the stoichiometric amount required for the magnesium and the $\gamma$-$MnO_2$ reaction with water to occur.

3. The hydrogen suppressing, flameless, heat generating chemical composition according to claim 1, wherein the hydrogen overvoltage suppressor is a metal sulfide.

4. The hydrogen suppressing, flameless, heat generating composition according to claim 1, wherein the reaction activator is magnesium chloride present in an amount from 0.001 to 50 percent by-weight.

5. The hydrogen suppressing, flameless, heat generating composition according to claim 4, wherein the reaction activator is mixed with milled magnesium-manganese dioxide mixtures prior to incorporating water into the reaction mixture.

6. The hydrogen suppressing, flameless, heat generating composition according to claim 1, wherein the reaction activator is a thermally and electrically conducting, high surface area synthetic graphite present in an amount from 0.001 to 50 percent by-weight.

7. The hydrogen suppressing, flameless, heat generating composition according to claim 6, wherein the synthetic graphite is Asbury 4827.

8. The hydrogen suppressing, flameless, heat generating composition according to claim 1, wherein the reaction activator is a conducting carbon present in an amount from 0.001 to 50 percent by-weight.

9. The hydrogen suppressing, flameless, heat generating composition according to claim 8, wherein the conducting carbon is Ketjenblack, Black Pearls® 2000, Black Pearls® 1300 or Asbury TC 307.

10. The hydrogen suppressing, flameless, heat generating composition according to claim 1, wherein the reaction activator is a conducting graphite or carbon present in an amount from 0.001 to 50 percent by-weight and the reaction activator is mixed with a magnesium-manganese dioxide mixture in a vibratory or ball mill for at least an hour.

11. The hydrogen suppressing, flameless, heat generating composition according to claim 1, wherein said cation is selected from the group consisting of an alkaline metal and an alkali metal.

12. The hydrogen suppressing, flameless, heat generating composition according to claim 1, wherein the metallic salt and water are added either sequentially or together.

13. A heater device comprising the hydrogen suppressing, flameless, heat generating chemical composition according to claim 1.

14. The heater device of claim 13 wherein the hydrogen suppressing, flameless, heat generating chemical composition is enclosed within a bag comprising a filter cloth, wherein said filter cloth comprises a 6-ply sonic bonded polypropylene laminate.

15. The heater device of claim 13 wherein the hydrogen suppressing, flameless, heat generating chemical composition is enclosed within a dual layer bag comprising a first layer comprising polyester fibers and a second layer comprising polypropylene fibers.

16. The heater device of claim 13 wherein the hydrogen suppressing, flameless, heat generating chemical composition is enclosed within a multi-layer bag comprising a plurality of layers of polyester fibers.

17. The heater device of claim 13 wherein the hydrogen suppressing, flameless, heat generating chemical composition is enclosed within a dual layer bag comprising an outer layer of 3-ply bonded polypropylene fiber cloth and an inner layer of spunbond/meltblown/spunbond filter media comprising polypropylene.

18. A meal, ready-to-eat package comprising the flameless heater device according to claim 13.

* * * * *